Mar. 20, 1923.
O. WESTMORELAND.
SPRING WHEEL.
FILED NOV. 4, 1922.
1,449,077.
2 SHEETS—SHEET 1.
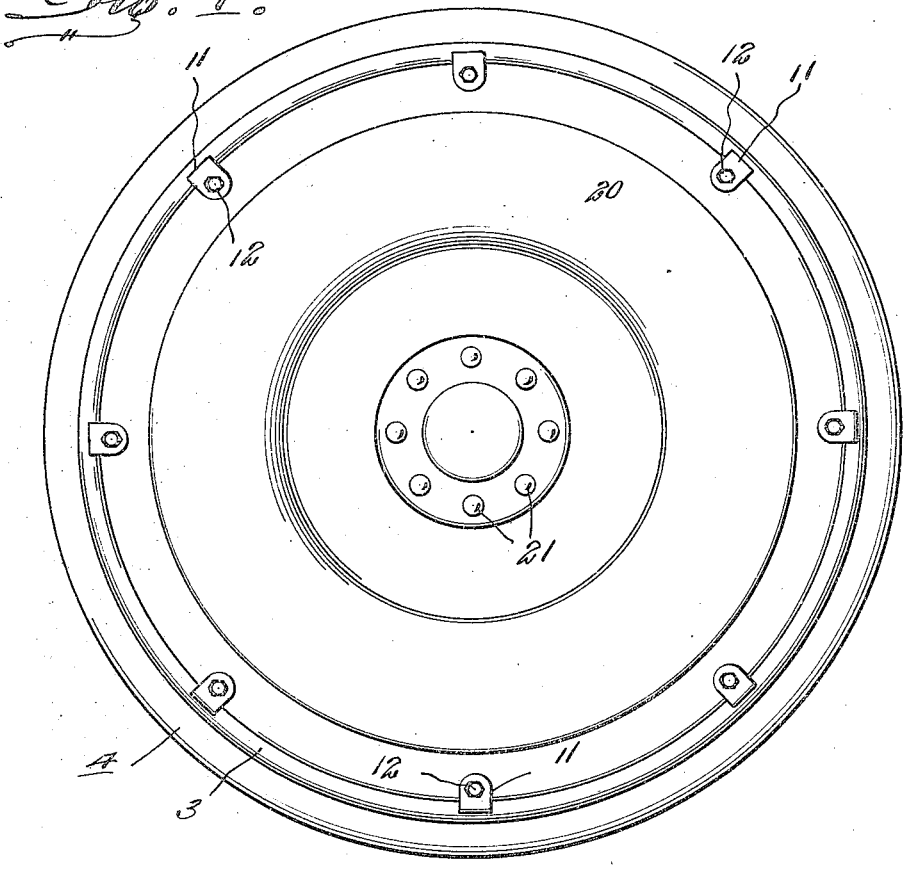
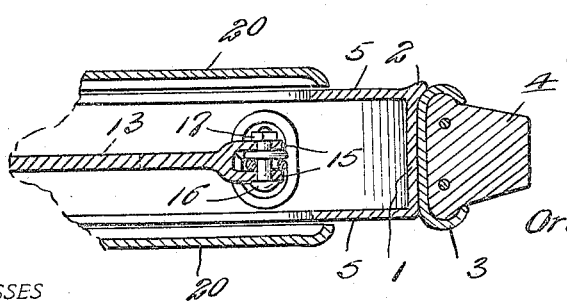
Orvel Westmoreland,
INVENTOR.

Mar. 20, 1923.
O. WESTMORELAND.
SPRING WHEEL.
FILED NOV. 4, 1922.
1,449,077.
2 SHEETS—SHEET 2.
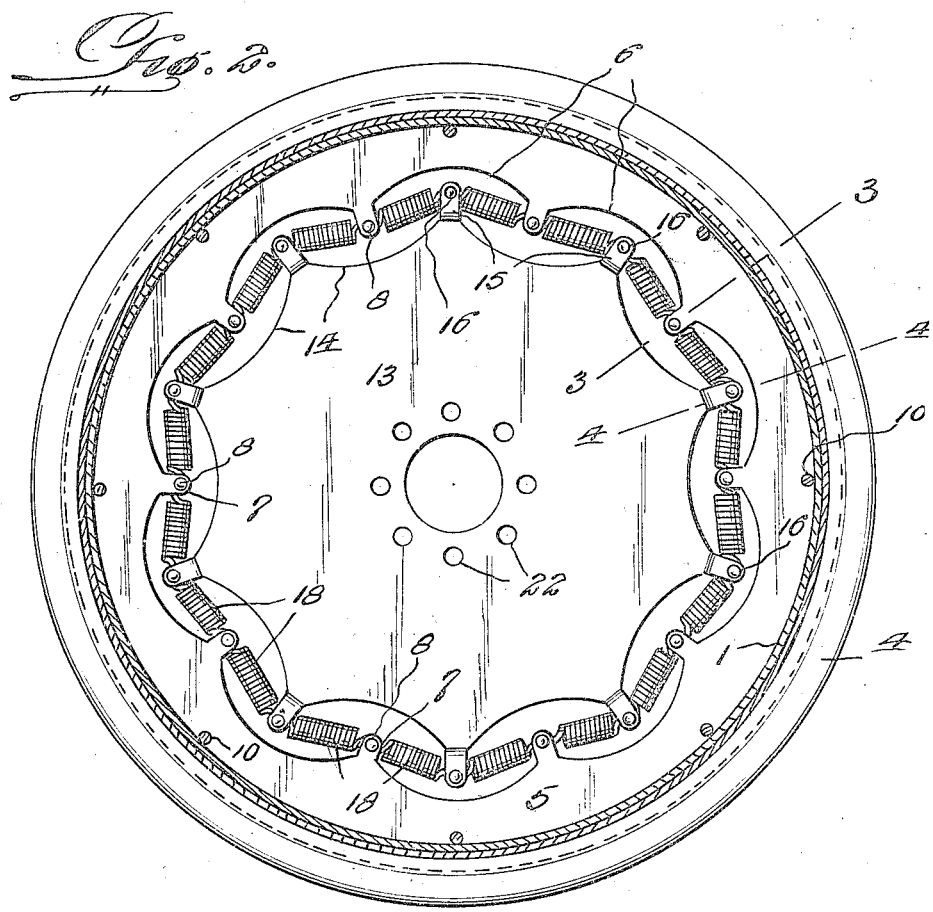
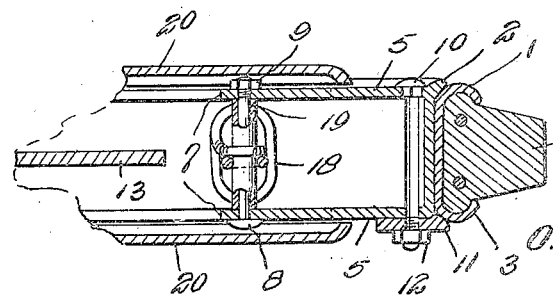
WITNESSES
Orvel Westmoreland,
INVENTOR.
BY
ATTORNEYS.

Patented Mar. 20, 1923.

1,449,077

UNITED STATES PATENT OFFICE.

ORVEL WESTMORELAND, OF TRUSCOTT, TEXAS.

SPRING WHEEL.

Application filed November 4, 1922. Serial No. 599,151.

*To all whom it may concern:*

Be it known that I, ORVEL WESTMORELAND, a citizen of the United States, residing at Truscott, in the county of Knox and State of Texas, have invented certain new and useful Improvements in Spring Wheels, of which the following is a specification.

This invention relates to new and useful improvements in spring wheels, and has for the primary object thereof, the provision of such a wheel that will effectively absorb a portion of the shocks, incident to a motor vehicle, thereby eliminating the use of expensive pneumatic tires.

A further object of the invention resides in the provision of a spring wheel that is comparatively simple of construction, inexpensive of manufacture and highly useful of purpose.

The nature and advantages of the invention will be better understood when the following detailed description is read in connection with the accompanying drawings, the invention residing in the construction, combination, and arrangement of parts as claimed.

In the drawings forming a part of this application, like numerals of reference indicate similar parts in the several views, and wherein:—

Figure 1 is a side elevational view of a wheel constructed in accordance with the present invention.

Figure 2 is a cross sectional view of the same, and

Figures 3 and 4 are fragmentary cross sectional views upon the lines 3—3 and 4—4 respectively of Figure 2.

In the drawings, there is shown a spring wheel constituting a rim 1, the inner end of the same being flared as at 2, and adapted to receive thereon a demountable tire rim, having a solid rubber tire 4 disposed therein. Formed upon each side of the rim 1, are depending skirt portions 5, the inner edges of which are scalloped as at 6. Adjacent ends of the scallops 6 of each skirt portion 5, have pendant lugs or ears 7 formed thereon for receiving therebetween headed bolts 8, the opposite ends of the same being screw threaded for the reception of retaining nuts 9. At spaced points between the depending skirt portions 5, at a point directly beneath the rim 1, there is provided cross bolts, headed at one end and screw threaded at their opposite ends. Rim retaining lugs 11 are loosely disposed upon the threaded ends of the bolts for engagement with one side of the tire rim 3, these lugs being retained in operative position by nuts 12, threaded onto the ends of the bolts. The tire rim is held onto the wheel rim at its opposite side by the above mentioned flared portion 2 of the wheel rim.

The hub of the wheel constitutes a centrally apertured annular plate member 13, the outer edge of which is scalloped as at 14. Between the ends of adjacent scallops, this hub member has formed thereon spaced projecting fingers or ears 14, more clearly shown in Figure 4, and extending between these ears are headed bolts 16, the opposite ends of which are threaded for receiving retaining nuts 17. As set forth in Figure 2, the projecting fingers or ears 15 of the hub 13 extend upwardly between adjacent pairs of the ears or lugs 7 on the skirt portions 5. Loosely retained between the before mentioned bolts 8 and 16 are short, relatively strong, coiled spring sections 18, the opposite ends of these spring sections being suitably bent for this purpose as clearly shown in Figures 3 and 4. If found desirable, the bolts 8 may have a protecting sleeve 19, loosely disposed thereon.

Positioned upon each side of the wheel are centrally perforated annular-shaped projecting shields 20, secured to the hub portion 13 by bolts 21, extending through annular rows of perforations 22 in the shields 20 and hub portion 13. In view of these shields 20, the same not only prevent the accumulation of dirt and moisture upon the hub 13 and springs 18, but also effectively prevent any lateral movement of the rim with respect to the hub.

In view of the above description, it is believed by me that the operation and advantages of the present wheel will be readily apparent to those skilled in the art, and while I have herein shown and described the preferred embodiment of the present invention, it is nevertheless to be understood that minor changes may be made therein without departing from the spirit, and scope of the invention as claimed.

What I claim as new is:—

In a spring wheel, a rim, depending skirt portions formed upon opposite sides of said rim, the edges of said skirt portions being scalloped, pendent fingers formed upon the ends of each of the scallops, a hub in the form of an annular disk or plate, the outer periphery thereof being also scalloped, projecting fingers formed upon the ends of each of the scallops and spring connections between the fingers of the rim and hub.

In testimony whereof I affix my signature.

ORVEL WESTMORELAND.